United States Patent [19]
Petersen et al.

[11] Patent Number: 6,049,530
[45] Date of Patent: Apr. 11, 2000

[54] SEGMENT PERFORMANCE MONITORING

[75] Inventors: Lars-Göran Petersen, Tumba, Sweden; Juan Noguera-Rodriguez, Tokyo, Japan

[73] Assignee: Telefonaktiebolaget LM Ericsson, Stockholm, Sweden

[21] Appl. No.: 08/879,888

[22] Filed: Jun. 20, 1997

[51] Int. Cl.[7] .............................. H04J 1/16; H04L 12/28
[52] U.S. Cl. .......................... 370/248; 370/394; 370/428
[58] Field of Search .................................. 370/242, 229, 370/231, 232, 235, 241, 248, 249, 251, 395, 399, 389, 409, 431, 465, 394, 428; 714/758, 799

[56] References Cited

U.S. PATENT DOCUMENTS

| | | | |
|---|---|---|---|
| 5,253,247 | 10/1993 | Hirose et al. | 370/232 |
| 5,321,688 | 6/1994 | Nakano et al. . | |
| 5,373,504 | 12/1994 | Tanaka et al. | 370/253 |
| 5,450,394 | 9/1995 | Gruber et al. | 370/253 |
| 5,524,106 | 6/1996 | Tremel et al. | 370/253 |
| 5,636,212 | 6/1997 | Ikeda | 370/232 |
| 5,661,722 | 8/1997 | Miyagi | 370/235 |

OTHER PUBLICATIONS

R. Damodaram et al., "Error Detection and Correction Options for Data Services in B–ISDN", IEEE, vol. 3 of 3, Dec. 2–5, 1990, San Diego, CA, pp. 1751–1757.

R. Iwase et al., "A Bit Error and Cell Loss Compensation Method for ATM Transport Systems", Electronics and Communications In Japan, Part I, vol. 76, No. 3, Mar. 1, 1993, pp. 16–30.

B. Makrucki, "On the Performance of Submitting Excess Traffic to ATM Networks" IEEE, vol. 1 of 3, Dec. 2, 1991, Phoenix, AZ, pp. 281–288.

T. Chen et al., "Monitoring and Control of ATM Networks Using Special Cells", IEEE Networks, vol. 10, No. 5, Sep. 1996, pp. 28–38.

A. Kamal, "A Performance Study of Selective Cell Discarding Using the End–of–Packet Indicator in AAL Type 5", IEEE, vol. 3, Apr. 2–6, 1995, Boston, MA, pp. 1264–1272.

J. Kim et al., "International Standardization of B–ISDN", Computer Networks and ISDN Systems, vol. 27, No. 1, Oct. 1994, pp. 5–27.

Draft New ITU–T Recommendation I.363.2 "B–ISDN ATM Adaptation Layer Type 2 Specification", Seoul, Feb. 1997, pp. 1–29.

"Integrated Services Digital Network (ISDN) Maintenance Principles, B–ISDN Operation and Maintenance Principles and Functions" ITU–T I.610, 1996, pp. 1–29.

*Primary Examiner*—Chau Nguyen
*Assistant Examiner*—Chiho Andrew Lee
*Attorney, Agent, or Firm*—Burns, Doane, Swecker & Mathis, L.L.P.

[57] ABSTRACT

In a telecommunications network, segments along a telecommunications connection causing data corruption or data degradation can be detected and precisely identified through a segment performance monitoring technique. The segment performance monitoring technique involves the generation, transmission, and analysis of specialized data packets which traverse a telecommunications connection node by node. At each node, a value for one or more segment performance characterization factors is accumulated based upon a predefined block of user-assigned data packets. Degradation of the data caused by any segment along the telecommunications connection can be determined, in part, by comparing the value for the one or more segment performance characterization factors to one or more performance characterization factor values generated by a source node.

48 Claims, 9 Drawing Sheets

SEGMENT PERFORMANCE MONITORING

BACKGROUND

The present invention relates to the transmission of data in a telecommunications network. More particularly, the present invention relates to detecting and locating segments responsible for corrupting or degrading telecommunications data along a telecommunications connection, for example, an asynchronous transfer method adaptation layer number two (AAL2) connection, traversing a number of switching points.

Asynchronous transfer mode (ATM) is a standard protocol for transmitting telecommunications data across a telecommunications network. It is based on the transmission of data in fixed size data packets, known as ATM cells, from a source node in the telecommunications network to a destination node via any number of intermediate switching nodes. Each ATM cell has a 48 octet payload portion and a five octet header portion. ATM is well known in the art.

ATM is frequently used for transporting low bit rate data in telecommunications networks, for example, low bit rate voice data. However, standard ATM does not efficiently transport low bit rate data. More specifically, standard ATM tends to add a significant time delay to the transmission of low bit rate data. Unfortunately, low bit rate data, such as low bit rate voice data, is highly sensitive to transmission delays. Consequently, several different ATM adaptation layers (AALs) have been developed to improve the efficiency ATM with respect to the transportation of low bit rate data, as is well known in the art.

AAL2 is one of the AALs which have been developed to improve the efficiency of ATM with respect to the transmission of low bit rate data. AAL2 is also well known in the art, and it is more thoroughly described in the B-ISDN ATM Adaptation layer Type 2 Specification, ITU Recommendation I.363.2 (herein referred to as "the AAL2 specification"). AAL2 makes ATM a more efficient vehicle for transporting low bit rate data by inserting low bit rate data from a number of different sources into AAL2 data packets, and then multiplexing the AAL2 data packets from the various sources onto a single ATM connection.

In accordance with the AAL2 specification, the standard format of an AAL2 data packet is similar to that of a standard ATM cell. For example, an AAL2 data packet also has a header portion and a payload portion. However, the header portion of an AAL2 data packet is 3 octets in length and the payload of an AAL2 data packet can vary from 1 octet to 64 octets.

The header portion of an AAL2 data packet more specifically comprises an 8 bit connection identifier (CID) field, a 6 bit length indicator (LI) field, a 5 bit user-to-user information (UUI) field, and a 5 bit header error control (HEC) code. The CID field defines the AAL2 channel to which the corresponding AAL2 packet belongs. According to the AAL2 specification, the AAL2 packet may be associated with one of 248 different AAL2 channels. Therefore, AAL2 data packets from as many as 248 different data sources can be multiplexed onto a single ATM connection. The LI field, as the name suggests, defines the length of the payload portion of the AAL2 data packet (e.g., the number of octets in the payload). The HEC code is specifically used for detecting errors in the header portion of the AAL2 packet.

There are 5 bits in the UUI field. Therefore, 32 different binary code combinations are possible. Two of these binary code combinations are specifically reserved for identifying the AAL2 data packet as an operation and maintenance (OAM) data packet. The first of these binary code combinations specifically identifies the AAL2 packet as an end-to-end packet. An end-to-end packet is always transmitted from a first node to a second node, transparent to any intermediate nodes located along the connection between the first and the second nodes. The second binary code combination identifies the AAL2 packet as a segment packet. A segment packet is transmitted from a first node to a second node adjacent to the first node, then re-transmitted back to the first node.

Standard ATM, in accordance with ITU-T Recommendation I.610, B-ISDN Operation and Maintenance Principles and Functions, herein referred to as the ATM OAM specification, provides an OAM performance monitoring function. The purpose of this performance monitoring function is to check the overall quality of the ATM connection. In accordance with the ATM OAM specification, the overall quality of the ATM connection is measured in terms of the number of ATM cells lost and the number of ATM cell payload bit errors.

In practice, the ATM OAM performance monitoring function is very complex. For example, degradation is typically identified by a connection endpoint such as a destination node. Consequently, the destination node is only aware that a degrading condition exists somewhere between the source node and the destination node. However, the precise location of the segment responsible for the degrading condition is not determined. Accordingly, the network manager must check each and every segment individually and on a regular basis, whether or not there is any indication that a performance degradation exists. This, in turn, results in an unnecessary expenditure of time and network resources (e.g., bandwidth). Therefore, a more simplified and efficient procedure is needed to detect and precisely locate segments causing data degradation along a telecommunications connection within a telecommunications network, and to do so on an "as needed" basis rather than on a periodic basis.

SUMMARY

Accordingly, it is an objective of the present invention to provide a simplified procedure for detecting segments causing data degradation in a telecommunications network.

It is another objective of the present invention to provide a simplified procedure for detecting segments causing data degradation in a telecommunications network that is initiated by an end user on an "as needed" basis, rather than by the network management on a periodic basis.

It is also an objective of the present invention to provide a more efficient procedure for locating segments causing data degradation in a telecommunications network so that a network manager can properly re-route data packets around these points, as required, to improve the quality of the overall connection.

It is still another objective of the present invention to provide a simplified and more efficient procedure for detecting and locating segments causing data degradation so that critical network resources are conserved.

In accordance with one aspect of the present invention, the foregoing and other objects are achieved by a method and/or an apparatus for detecting segment performance in a telecommunications connection. The method and/or apparatus involves transmitting a block of data from a first node in the telecommunications connection to a second node in the telecommunications connection, and transmitting a first communication packet from the first node to the second node, wherein the first communication packet contains a value for a segment performance characterization factor based on the block of data. Then, in the second node, a value is formulated for the segment performance characterization factor as a function of the block of data, and the block of data is forwarded to a third node in the telecommunications connection. Next, the value of the segment performance characterization factor in the first communication packet is compared with the value of the segment performance characterization factor formulated by the second node, and the first communication packet is forwarded from the second node to the third node for further processing if the value of the segment performance characterization factor in the first communications packet compares with the value of the segment performance characterization factor formulated by the second node. However, if the value of the segment performance characterization factor in the first communication packet does not compare with the value of the segment performance characterization factor formulated by the second node, the first communication packet is forwarded from the second node to a destination node and any intermediate nodes located along the telecommunications connection between the second node and the destination node without further processing, and a second communication packet is generated, indicating that segment performance degradation has been detected.

In accordance with another aspect of the present invention, the foregoing and other objects are achieved by a method and/or an apparatus for monitoring the performance of one or more segments along a telecommunications connection. The method and/or the apparatus involves determining whether to monitor the performance of the one or more segments based on a number of participating nodes along the telecommunications connection. Then, if it is determined that the performance of the one or more segments is to be monitored, a block of data packets is transmitted from a source node to a destination node and each intermediate node along the telecommunications connection located between the source node and the destination node. In addition, a first value for a segment performance characterization factor is generated based on the block of data packets, then inserted into a first communication packet, which is transmitted from the source node to the destination node and each intermediate node. Then, in a participating intermediate node, the first communication packet is processed by formulating a second value for the segment performance characterization factor and by comparing the formulated second value to the first value. The first communication packet is forwarded from the participating intermediate node to the destination node and each intermediate node between the participating intermediate node and the destination node without further processing if the first value and the second value do not match. Consequently, a second communication packet is generated indicating segment performance degradation has been detected if the first value does not match the second value. However, if the first value and the second value match, the first communication packet is forwarded to a next participating intermediate node for processing.

BRIEF DESCRIPTION OF THE DRAWINGS

The objects and advantages of the invention will be understood by reading the following detailed description in conjunction with the drawings in which.

DETAILED DESCRIPTION

The present invention identifies and locates segments causing data degradation at or between switching nodes in a telecommunications connection. Although the following discussion describes the present invention in terms of an implementation that employs the asynchronous transfer mode adaptation layer number two (AAL2), one skilled in the art will recognize that the present invention could be applied using the asynchronous transfer mode (ATM) layer, or other ATM adaptation layers (AALs) which are well known in the art.

Figure 1:
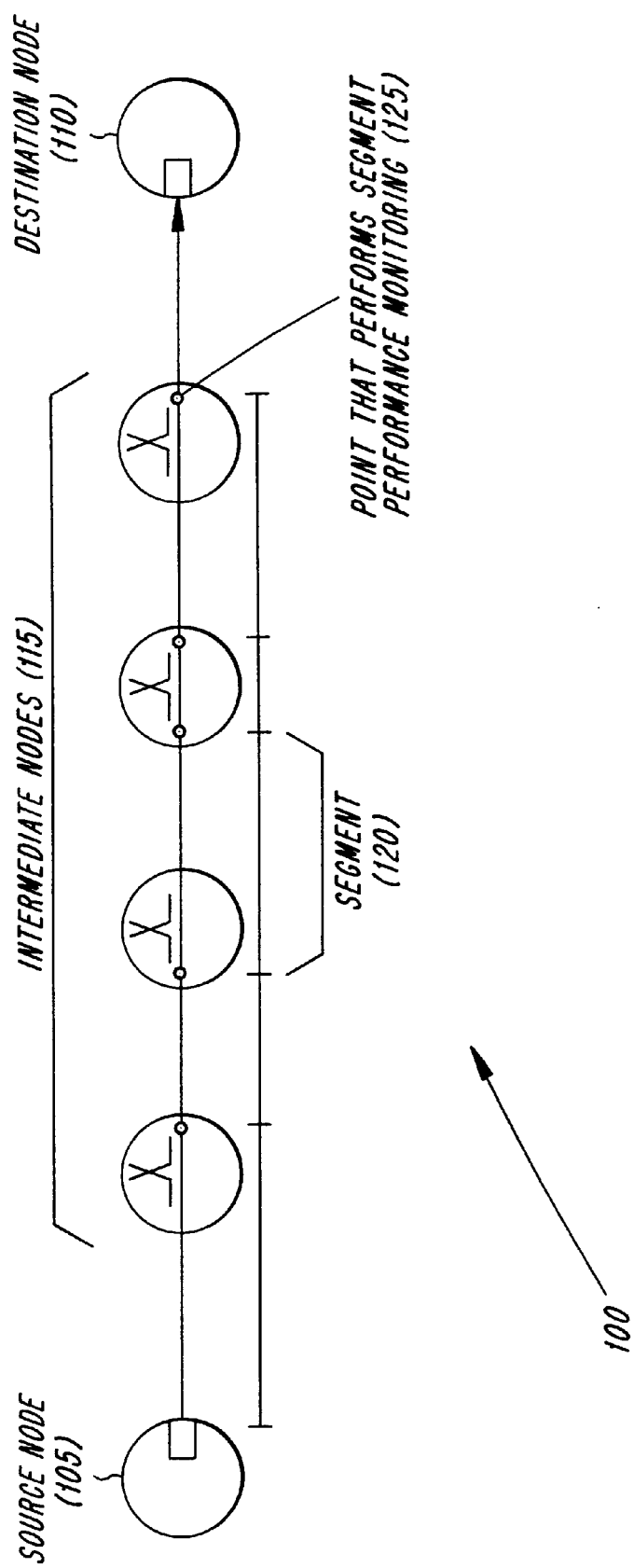
FIG. 1 shows an AAL2 connection in accordance with the prior art.

FIG. 1 represents an AAL2 connection 100 between a source node 105 and a destination node 110. The AAL2 connection 100 includes four intermediate nodes 115 between the source node 105 and the destination node 110. The purpose of the intermediate nodes 115 is to perform the switching functions that are necessary to route an AAL2 data packet (not shown) along the AAL2 connection 100 from the source node 105 to the destination node 110.

In general, the link between each node in the AAL2 connection 100 comprises a number of multiplexed AAL2 channels. The AAL2 packets associated with AAL2 connection 100 occupy only one channel in each link. AAL2 packets associated with other AAL2 connections which overlap in whole or in part the AAL2 connection 100 occupy the other AAL2 channels. As stated above, routing data through a telecommunications network using AAL2 is well known in the art.

On occasion, a point or segment along a telecommunications connection, such as the AAL2 connection 100, cause the data traversing that point to become corrupted. In accordance with a preferred embodiment of the present invention, a three-phase segment performance monitoring technique is provided for precisely locating these points or segments, wherein a segment, such as the segment 120, is defined as a portion of the AAL2 connection 100 between two points capable of performing segment performance monitoring. The three phases of the preferred embodiment are the activation phase, the monitoring phase and the reporting phase.

The purpose of the activation phase is to poll each of the intermediate nodes along the AAL2 connection to establish how many can allocate the resources (e.g., segment performance monitoring processing points such as processing point 125) that are necessary to participate in the monitoring phase of the segment performance monitoring session. This information is then used by the source node to determine whether it is feasible to proceed with the remaining phases of the segment performance monitoring process.

To poll the intermediate nodes, a source node (e.g., source node 105) transmits an activation AAL2 packet along the AAL2 connection 100 in the direction of the destination node 110. The UUI field in the AAL2 header of the activation AAL2 packet identifies the activation AAL2 packet as a segment AAL2 packet. Accordingly, the activation AAL2 packet is received by each intermediate node between the source node 105 and the destination node 110. Upon receiving the activation AAL2 packet, which contains, among other things, an estimation as to how long the segment performance monitoring session is expected to last, each intermediate node determines whether it can allocate resources for this segment performance monitoring session. If an intermediate node determines that it has the resources available to participate in the remaining phases of the segment performance monitoring session, the intermediate node increments a first counter in the payload of the activation AAL2 packet. This first counter is referred to as a regard counter. If the intermediate node determines that it does not have the resources available to participate, the intermediate node increments a second counter referred to as a disregard counter. The activation AAL2 packet is then passed to each intermediate node along the AAL2 connection, each of which increments the appropriate counter, until the activation AAL2 packet reaches the destination node 110.

In a preferred embodiment, segment performance is determined by monitoring one of two different segment performance characterization factors, or both, as will be explained in greater detail below. Accordingly, the activation AAL2 packet contains a regard counter and a disregard counter for each segment performance characterization factor. If the source node intends to monitor segment performance using both segment performance characterization factors, each intermediate node must increment the appropriate counter for both segment performance characterization factors.

Upon receiving the activation AAL2 packet, the destination node 110 generates a confirm AAL2 packet. In generating this packet, the destination node 110 copies the contents of each of the regard and disregard counters. The confirm packet is then marked as an end-to-end packet and transmitted to the source node 105. Since the confirm AAL2 packet is identified as an end-to-end packet, it re-traverses the AAL2 connection 100 from the destination node 110 to the source node 105 without being processed by any of the intermediated nodes 115 or processing points such as processing point 125. The confirm AAL2 packet provides the source node 105 with the results of the poll (i.e., with the information regarding the availability of resources). The source node 105 can then use this information to determine whether it is feasible to begin the monitoring phase of the segment performance monitoring session.

Figure 2:
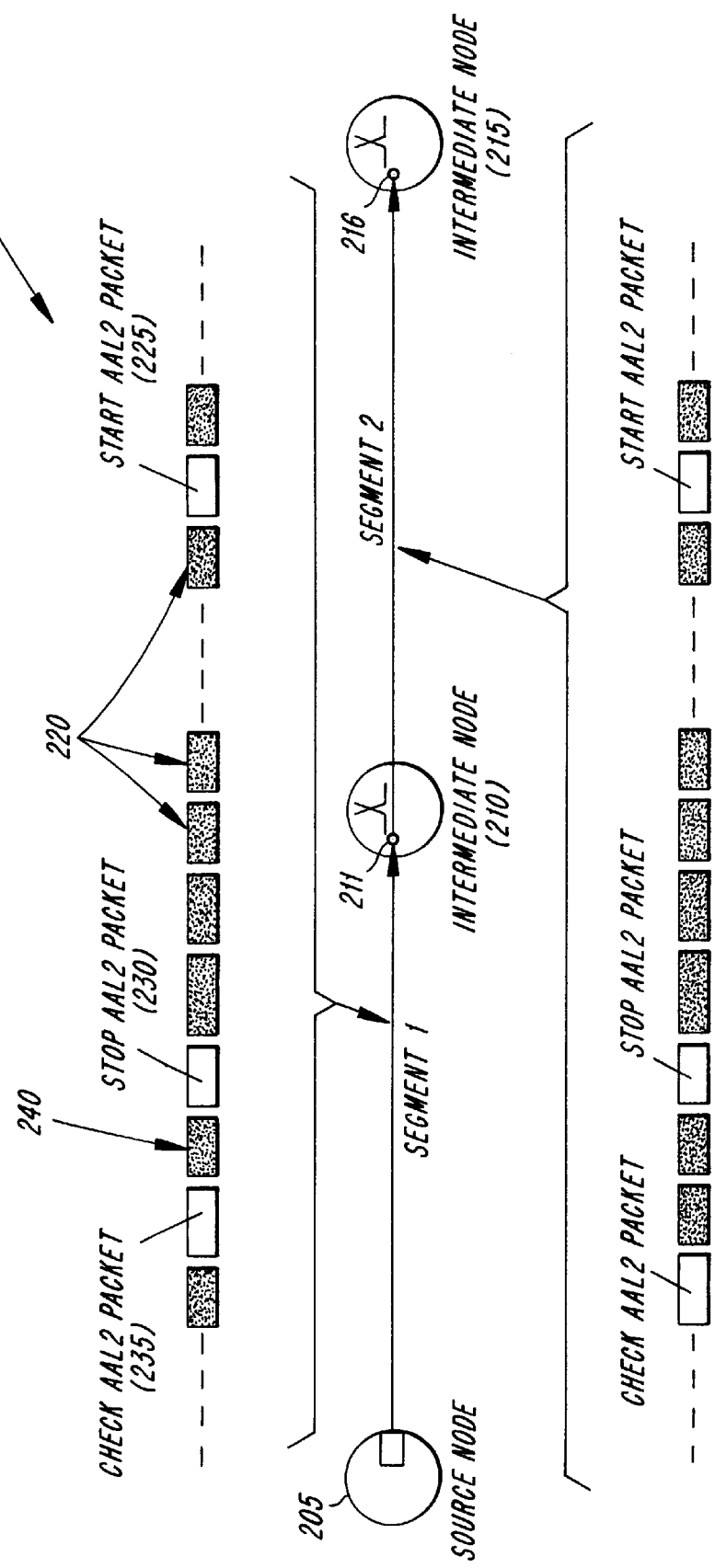
FIG. 2 illustrates the monitoring phase of a segment performance monitoring session, in accordance with an exemplary embodiment of the present invention.

FIG. 2 illustrates the procedure associated with the monitoring phase, during which, the performance of one or more segments along the AAL2 connection are tested in terms of one or more segment performance characterization factors. Specifically, FIG. 2 shows a portion of an AAL2 connection 200 including a source node 205, a first intermediate node 210 and a second intermediate node 215. Both of the intermediate nodes 210 and 215 contain a segment performance monitoring processing point 211 and 216 respectively, wherein segment performance monitoring processing point 211 monitors the performance of segment 1 between the source node 205 and the intermediate node 210, and segment performance monitoring processing point 216 monitors the performance of segment 2 between the intermediate node 210 and the intermediate node 215.

At the beginning of the performance monitoring phase, the source node 205 transmits a block of user-assigned AAL2 data packets 220. In a preferred embodiment of the present invention, the source node 205 also transmits a start AAL2 packet 225 and a stop AAL2 packet 230. The start and stop AAL2 packets 225 and 230 precisely define the boundaries of the block of user-assigned AAL2 data packets 220 for the segment performance monitoring points. During the monitoring phase, the segment performance monitoring processing points accumulate or formulate a value for one or more segment performance characterization factors by analyzing each AAL2 packet in the block.

Based upon each AAL2 data packet in the block of user-assigned AAL2 data packets 220, the source node 205 generates a value for one or more segment performance characterization factors. In a preferred embodiment, the source node 205 generates a packet count and/or a block error detection code (e.g., a bit interleaved parity bit-wise per octet code). However, one skilled in the art will recognize that other segment performance characterization factors may be employed to monitor segment performance without departing from the spirit of the present invention. In general, the source node 205 stores the generated value for the segment performance characterization factor or factors in a check AAL2 packet 235, and then transmits the check AAL2 packet 235 to the first intermediate node 210. A more specific format for storing the value associated with the segment performance characterization factor or factors in the check AAL2 packet 235 is discussed in more detail below.

Deriving the value for a segment performance characterization factor, such as the packet count and/or the block error detection code takes time. As stated above, AAL2 is generally utilized for transporting low bit rate data (e.g., low bit rate voice data) which is typically sensitive to transmission delays. Therefore, in a preferred embodiment of the present invention, the source node 205 continues to transmit user-assigned AAL2 data packets, for example, user-assigned AAL2 data packet 240, while the source node 205 is generating a value for the segment performance characterization factor or factors.

In an alternative embodiment, a value for the segment performance characterization factor or factors can be generated and then stored in the stop AAL2 packet. However, the formulation of these values takes time, as previously mentioned. Therefore, to store these values in the stop AAL2 packet would result in a delay in the transmission of the stop AAL2 packet. It also results in a delay in the transmission of additional user-assigned AAL2 data packets since the stop AAL2 packet must be the next data packet to follow the last AAL2 data packet in the block of user-assigned AAL2 data packets 220. As one skilled in the art will understand, an appreciable delay in the transmission of the stop AAL2 packet would not result in a very efficient utilization of bandwidth.

At a segment performance monitoring processing point, for example, segment performance monitoring point 211, the start AAL2 packet 225 is detected by the binary code combination corresponding to start AAL2 packets stored in the OAM packet header. The start AAL2 packet 225 informs the segment performance monitoring processing point 211 that the following block of user-assigned AAL2 data packets 220 is to used for monitoring the segment performance of segment 1, as illustrated in FIG. 2. Accordingly, the segment performance monitoring processing point 211 cumulatively formulates a value for the one or more segment performance characterization factors using the same computational procedures as used by the source node 205. In a preferred embodiment, the segment performance characterization factors include a packet count and/or a block error detection code, as stated above.

The check AAL2 packet 235 contains two data fields for each segment performance characterization factor. In a preferred embodiment of the present invention, therefore, the check AAL2 packet 235 contains a first and a second data field for the packet count and a first and a second data field for the block error detection code. The first data field houses the generated value. This is the value formulated by the source node 205. The second data field is a measured value. Initially, the source node 205 sets the measured value equal to the generated value.

After detecting the stop AAL2 packet 230, the segment performance monitoring processing point 211 must wait until it receives the check AAL2 packet 235. Upon receiving the check AAL2 packet 235, the segment performance monitoring processing point 211 first determines whether the generated value stored in the generated value data field and the measured value stored in the measured value data field are equal, for each performance characterization factor. If the measured value and the generated value do not match, this is an indication that segment 1 has corrupted the data. The segment performance monitoring point 211 then forwards the check AAL2 packet 235 down the remainder of the AAL2 connection 200, without any further processing by segment performance monitoring processing points other than to release the network resources at each segment performance monitoring processing point. If the segment performance monitoring point 211 determines that the generated value equals the measured value, for each performance characterization factor, the segment performance monitoring processing point 211 compares the generated value, for each segment performance characterization factor, with the accumulated value formulated by the segment performance monitoring processing point 211 based on the block of user-assigned AAL2 data packets 220. If the segment performance monitoring processing point 211 detects a mismatch, the segment performance monitoring processing point 211 stores the accumulated value in the measured value data field and forwards the check AAL2 packet 235 through the remaining portion of the AAL2 connection 200 without further processing, as explained above. If the segment performance monitoring processing point 211 detects no mismatch (i.e., if there is no indication of data degradation caused by segment 1), the segment performance monitoring processing point 211 forwards the check AAL2 packet 235 to the next segment performance monitoring processing point 216. In general, the check AAL2 packet is forwarded to each intermediate node, or more specifically, to each segment performance monitoring processing point in the AAL2 connection 200. However, in a preferred embodiment in the present invention, only those intermediate nodes allocating resources actually extracts and processes the check AAL2 packet 235.

Once a segment performance monitoring processing point detects a degradation condition, the contents of the check AAL2 packet 235 become fixed, and, as mentioned above, the check AAL2 packet 235 is passed along the remainder of the AAL2 connection until it reaches a destination node (not shown in FIG. 2). As described in more detail below, the check AAL2 packet also contains a message field. The code stored in the message field provides additional information as to the circumstances surrounding the detection and corrective action taken, if any. When the check AAL2 packet 235 reaches the destination node, the destination node converts the check AAL2 packet 235 into a reporting AAL2 packet by changing the binary code combination in the OAM packet header, and by changing the UUI in the AAL2 packet header to reflect an end-to-end data packet. The destination node then transmits the reporting AAL2 packet back to the source node 205. Since the reporting AAL2 packet is designated as an end-to-end data packet, it traverses the AAL2 connection 200 from the destination node to the source node 205, in a way that is transparent to the intermediate nodes located along the AAL2 connection 200 between the source node 205 and the destination node.

In an alternative embodiment, the intermediate node associated with the segment performance monitoring processing point responsible for detecting the degradation condition transmits a report AAL2 packet directly to the source node 205. Preferably, the message field in the report AAL2 packet contains an appropriate message code indicating whether any action has or will be taken. Again, the report AAL2 packet is identified as an end-to-end packet so that it traverses the AAL2 connection 200 back to the source node 205 in a manner that is transparent to the various intermediate nodes. In addition, the intermediate node detecting the degradation may notify the network system management.

The source node 205 deactivates the segment performance monitoring session after it receives the report AAL2 packet. The source node 205 may also take a number of appropriate actions in accordance with the message code in the message field of the report AAL2 packet.

Another aspect of the present invention includes a segment performance monitoring timer at each node to prevent the possibility of infinite network resource allocation. In accordance with this aspect of the present invention, the segment performance monitoring timers at each node are initialized with an estimated time to complete the segment performance monitoring session. The estimated time is stored in the activation AAL2 packet by the source node, as explained above. If a timer elapses before the completion of the segment performance monitoring session, the resources allocated by the corresponding node are released, and the segment performance monitoring session is aborted.

Figure 3:
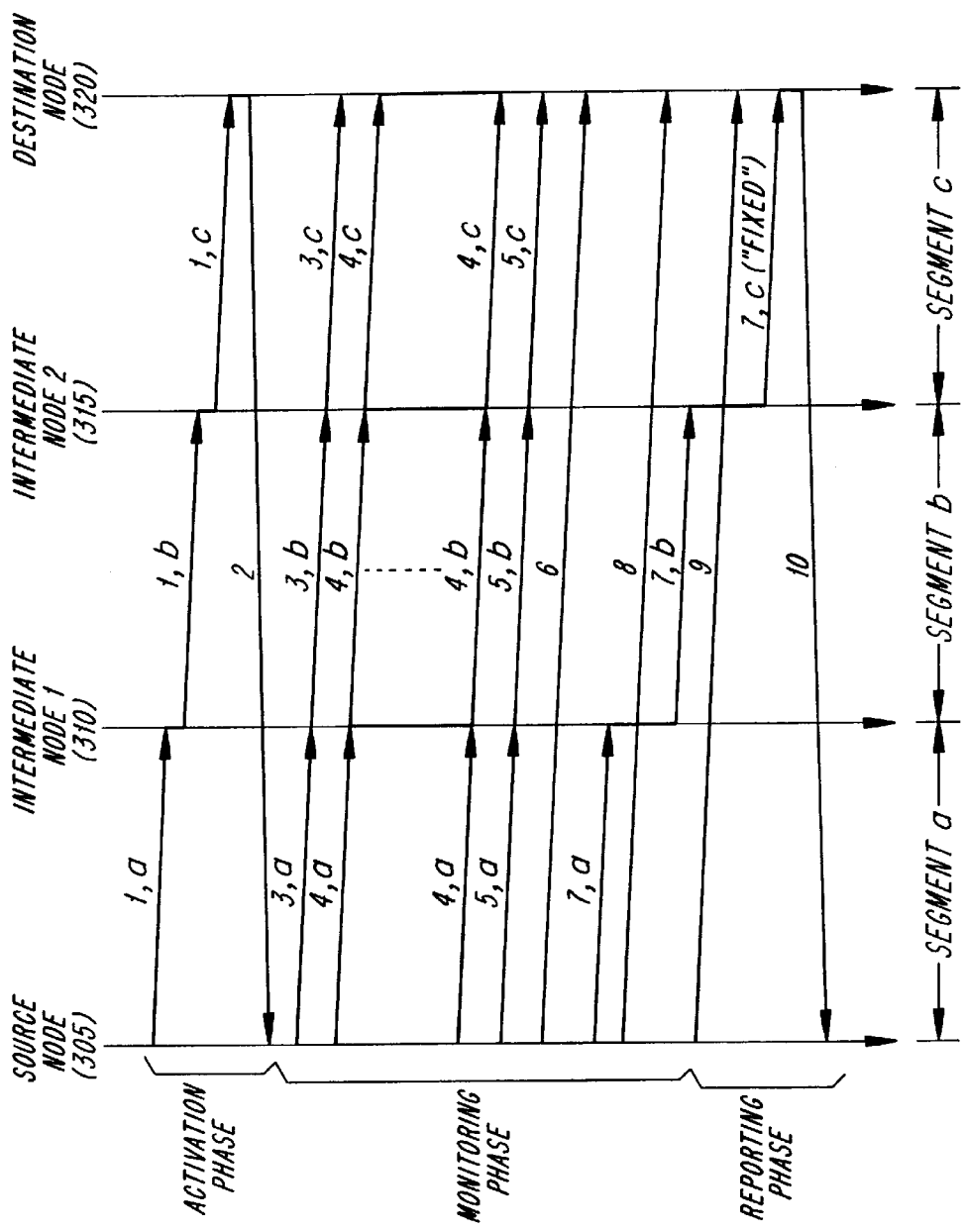
FIG. 3 shows an overview of the signalling that occurs during all three phases of a segment performance monitoring session.

FIG. 3 summarizes the segment performance monitoring technique, in accordance with a preferred embodiment of the present invention. In this example, the AAL2 connection comprises a source node 305, a first intermediate node 310, a second intermediate node 315 and a destination node 320.

At the beginning of the activation phase, the source node 305 generates an activation AAL2 packet 1. The activation AAL2 packet 1 is a segment packet, as indicated in the UUI of the AAL2 packet header. Therefore, in FIG. 3, activation AAL2 packet 1a, 1b and 1c represent the activation AAL2 packet 1 as it propagates along each of the segments a, b and c which make up the AAL2 connection. The activation AAL2 packet 1 is analyzed by each intermediate node to determine whether the node can provide the necessary resources to support the segment performance monitoring session. The time required by each node to determine whether resources will be allocated for the segment performance monitoring session is illustrated in FIG. 3 by the vertical lines associated with the first intermediate node 310 and the second intermediate node 315. When the activation AAL2 packet 1 reaches the destination node 320, the destination node 320 generates a confirm AAL2 packet 2. The confirm AAL2 packet 2 is an end-to-end packet; as such it traverses the AAL2 connection from the destination node 320 to the source node 305 without any processing at the intermediate nodes 310 and 315, as illustrated in FIG. 3. The source node 305 then utilizes the confirm AAL2 packet 2 to determine whether or not to proceed with the segment performance monitoring session.

If the source node 305 decides to proceed with the segment performance monitoring procedure, the source node 305 generates a start AAL2 packet 3, followed by a block of user-assigned AAL2 data packets 4, followed by a stop AAL2 packet 5. At the intermediate nodes 310 and 315, a value for the segment performance characterization factor or factors (e.g., a packet count and/or a block error detection code such as a bit interleave parity code) is accumulated based upon the block of user-assigned AAL2 data packets 4. The accumulated values are stored and the intermediate nodes 310 and 315 await the arrival of the check AAL2 packet 7.

As stated above, the source node 305 continues to transmit user-assigned AAL2 data packets, for example user-assigned data packets 6, 8 and 9, while the check AAL2 packet 7 is being generated by the source node 305 and/or processed by the intermediate nodes 310 and 315, in order to prevent data transmission delays.

In this example, the second intermediate node 315 detects a mismatch, thereby indicating that the segment between the second intermediate node 315 and the first intermediate node 310, i.e., segment b, has caused the data to become corrupted. Accordingly, the contents of the check AAL2 packet 7 become fixed. The second intermediate node 315 then forwards the check AAL2 packet 7 to the destination node 320.

During the reporting phase, the destination node 320 prepares an end-to-end report AAL2 packet 10 based upon the check AAL2 packet 7. The destination node 320 then transmits the report AAL2 packet 10, which traverses the AAL2 connection back to the source node 305 without any processing at the intermediated nodes 310 and 315.

Figure 4:
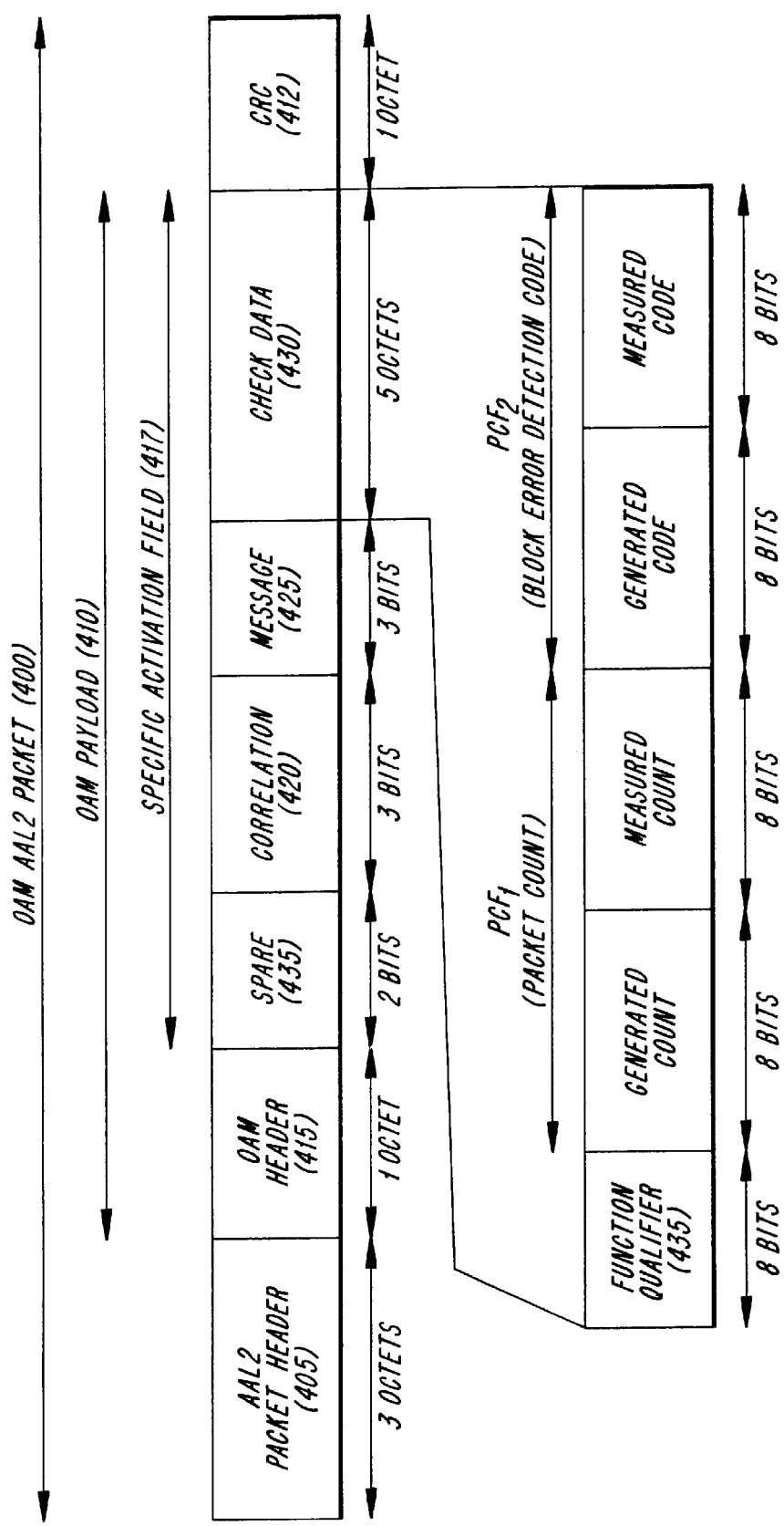
FIG. 4 shows an exemplary format for an OAM AAL2 packet.

FIG. 4 shows an exemplary format for an OAM AAL2 packet 400 used for the check AAL2 packets and the report AAL2 packets. In accordance with a preferred embodiment of the present invention, the OAM AAL2 packet 400 includes an AAL2 packet header portion 405, an OAM payload 410, and a 1 octet cyclic redundancy code (CRC) 412. The AAL2 packet header 405, described above, includes a bit UUI field. Also described above, is the fact that two of the UUI binary code combinations, for example code combinations 11110 (i.e., 30 in decimal) and 11111 (i.e., 31 in decimal), specifically identify the OAM AAL2 packet 400 as either a segment OAM AAL2 packet or as an end-to-end OAM AAL2 packet. The check AAL2 packet is an example of a segment packet, while the report AAL2 packet is an example of an end-to-end packet.

FIG. 4 also shows that, in accordance with a preferred embodiment of the present invention, the OAM payload 410 includes a 1 octet OAM header 415 and a 6 octet specific activation field 417. The specific activation field 417 further comprises a 3 bit correlation field (420), a 3 bit message field (425), a 5 octet check data field (430), and two spare bits (435) for future considerations. However, one skilled in the art will recognize that the position and length of each field in the OAM payload 410 may vary without departing from the intended scope of this invention. The preferred format for the OAM header 415 is similar to the format of the AAL2 header described above and defined in ITU Recommendation I.363.2, B-ISDN Operation and Maintenance Principles and Functions, section 4.2, 6 and 7. More specifically, the OAM header 415 reflects one of a number of possible binary code combinations which defines the OAM function corresponding to the OAM AAL2 packet 400. At least one of these binary code combinations identifies the OAM AAL2 packet 400 as a check AAL2 packet. At least one other binary code combination identifies the OAM AAL2 packet 400 as a report AAL2 packet.

The correlation field 420 is a 3 bit code used for correlating AAL2 packets (e.g., the check and report AAL2 packets) associated with the same segment performance monitoring session. This is important because any given node, including the source node, may be shared by two or more overlapping AAL2 connections, and involved with more than one pending segment performance monitoring session at a time. In a preferred embodiment of the present invention, the correlation field 420 is a 3 bit wrap around counter, and the value of the counter is controlled exclusively by the source node.

The message field 425 is also a 3 bit code. Primarily, the message field 425 is used to convey specific information and/or instructions to the source node. For example, a message might indicate whether appropriate action has been taken in response to a performance degradation detection. TABLE I contains six exemplary messages that might be encoded in the message field 425. One skilled in the art will recognize, however, that this list is exemplary and that other messages could be utilized.

In a preferred embodiment, the check data field 430 comprises a 2 octet data field for a first segment performance characterization factor ($PCF_1$) and a second 2 octet data field for a second segment performance characterization factor ($PCF_2$). Moreover, the first segment performance characterization factor $PCF_1$ corresponds to a packet count, while the second performance characterization factor $PCF_2$ corresponds to a block error detection code, such as a bit interleaved parity code. Each 2 octet data field, in turn, comprises two 1 octet data fields. The first being reserved for a generated value for the segment performance characterization factor and the second being reserved for a measured value for the segment performance characterization factor. The purpose of the generated value and the measured value are described above with reference to FIG. 2. Furthermore, it will be readily apparent to one skilled in the art that other segment performance characterization factors may be employed to monitor segment performance in lieu of, or in addition to, the two preferred segment performance characterization factors described above.

The check data field 430 also comprises a 1 octet PCF qualifier code 435. The PCF qualifier code 435 identifies which segment performance characterization factor or factors are to be used during the segment performance monitoring session. In a preferred embodiment, one bit position, for example, bit position 0, corresponds with the first segment performance characterization factor (i.e., the packet count), while a second bit position, for example, bit position 1, corresponds with the second segment performance characterization factor (i.e., the block error detection code). Therefore, if the source node intends to employ a packet count to monitor segment performance during the segment performance monitoring session, the bit position 0 is set equal to one. Likewise, if the source node intends to employ the block error detection code to monitor segment performance during the segment performance monitoring session, the bit position 1 is set equal to one. If the source node intends to employ both the packet count and the block error detection code, then both bit positions 0 and 1 are set equal to one. As previously stated, one skilled in the art will recognize that other segment performance characterization factors may be employed in lieu of or in addition to the ones mentioned above. If other segment performance characterization factors are employed in addition to those identified above, it may be necessary to expand the length of the check data field 430 accordingly. The remaining bit positions 2–7 in the PCF qualifier code 435 could be employed to activate these additional segment performance characterization factors if desired.

TABLE I

| Message Code | Message |
|---|---|
| 001 | No message inserted by source node. |
| 002 | Performance degradation detected; system management presently cannot be notified; will try again later; reduce traffic across the connection. |
| 003 | Performance degradation detected; system management cannot presently fix the problem; reduce traffic across the connection. |
| 004 | Performance degradation detected; release connection and re-set. |
| 005 | Performance degradation detected; system management notified; matching resources allocated. |
| 006 | Performance degradation detected; traffic contract not in accordance with measured traffic; release and re-set connection with matching traffic contract. |

Figure 5:
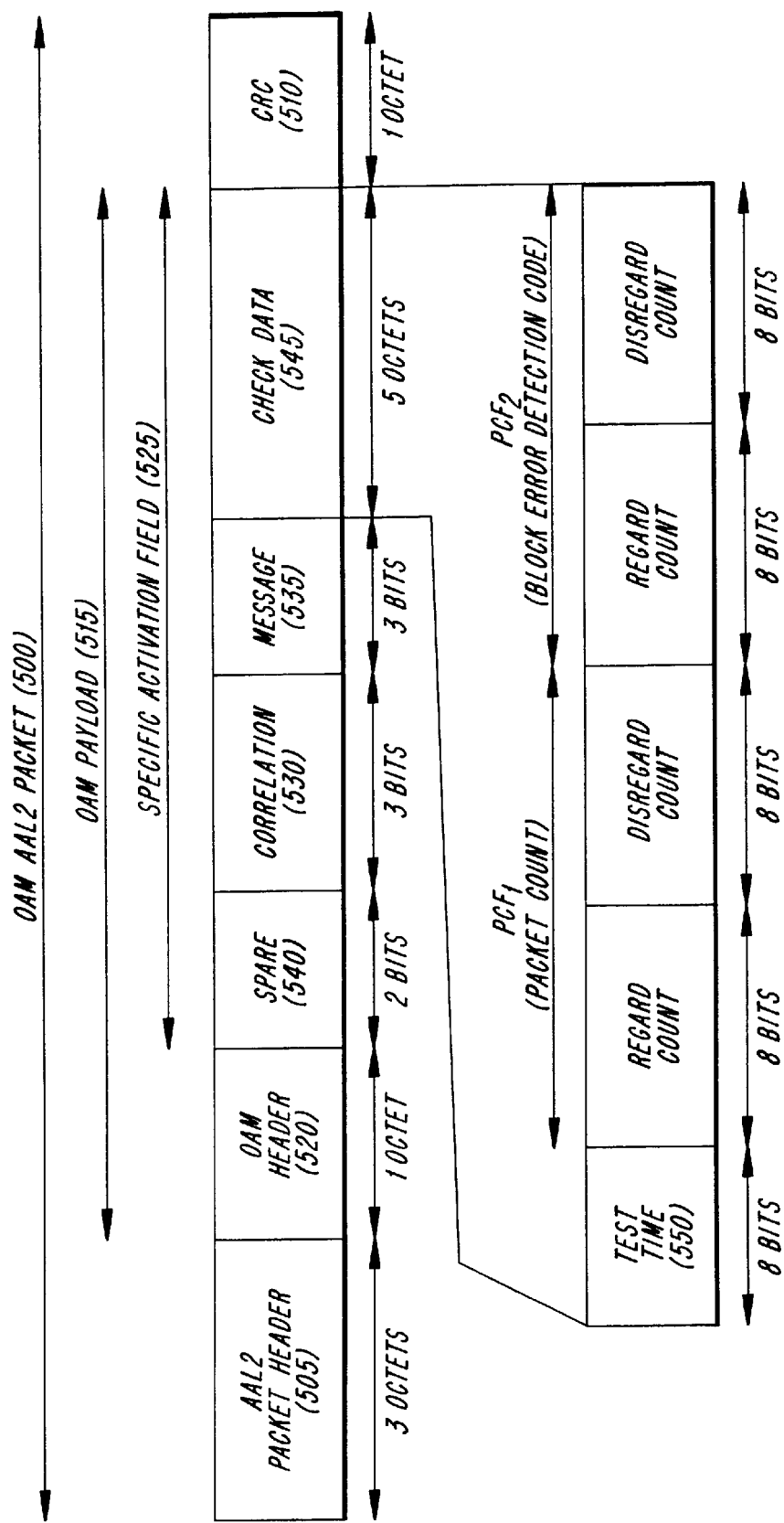
FIG. 5 shows another exemplary format for an OAM AAL2 packet.

FIG. 5 shows an exemplary format for an OAM AAL2 packet 500 used for the activation AAL2 packets and the confirm AAL2 packets. In accordance with a preferred embodiment of the present invention, the OAM AAL2 packet 500 includes an AAL2 packet header portion 505, which has an identical format as the AAL2 packet header 405 described above; a 1 octet cyclic redundancy code (CRC) 510, which is used for protecting the integrity of the other data fields in the OAM AAL2 packet 500, as is well-known in the art; and an OAM payload portion 515.

The OAM payload portion 515 is substantially similar to the OAM payload portion 410 described above. For instance, the OAM payload portion 515 includes an OAM header 520, wherein at least one of the OAM header binary code combinations identifies the OAM AAL2 packet as an activation AAL2 packet, while at least one other OAM header binary code combination identifies the OAM AAL2 packet as a confirm AAL2 packet. Like the OAM payload portion 410, the OAM payload portion 515 also includes a 6 octet specific activation field 525. The specific activation field 525 further comprises a 3 bit correlation field 530, which is identical in format and function as the correlation field 420 described above; a 3 bit message field 535; two spare bits 540, which are reserved for future considerations; and a 5 octet check data field 545.

The check data field 545 is also very similar to the check data field 430 described above. For example, the check data field 545 includes a 2 octet performance characterization factor (PCF) data field for each segment performance characterization factor. As stated, in a preferred embodiment, two segment performance characterization factors are employed, a packet count and a block error detection code. Hence, the check data field 545 contains two 2 octet PCF data fields $PCF_1$ and $PCF_2$. However, as stated above, other segment performance characterization factors may be employed in lieu of, or in addition to the preferred segment performance characterization factors.

Each PCF data field $PCF_1$ and $PCF_2$ includes two 1 octet data fields. The first of these 1 octet data fields is an 8 bit regard counter. The second 1 octet data field is an 8 bit disregard counter. In general, the regard counter reflects the number of intermediate nodes in the AAL2 connection that have indicated the ability to allocate resources for monitoring a corresponding segment performance characterization factor during the monitoring phase of the segment performance monitoring session.

Initially, the source node sets all counters in the activation AAL2 packet equal to zero. As the activation AAL2 packet is forwarded from the source node to the destination node, each intermediate node increments the appropriate counter or counters. The destination node, upon receiving the activation AAL2 packet, transforms the AAL2 packet into a confirm AAL2 packet by adjusting the code in the UUI field of the AAL packet header 505 to reflect an end-to-end packet, and by adjusting the binary code combination of the OAM packet header 520 to reflect a confirm AAL2 packet. The destination node then transmits the confirm packet to the source node, thereby informing the source node as to how many intermediate nodes can or cannot participate in the monitoring phase of the segment performance monitoring session with respect to one or both segment performance characterization factors.

In order for an intermediate node to determine whether to allocate resources during the segment performance monitoring session, the intermediate node needs certain information. One such piece of information is the segment performance characterization factor or factors the source intends to utilize in monitoring segment performance. Without this information, the intermediate node cannot properly determine whether to allocate its resources nor can the intermediate node know which counter or counters to increment in the activation AAL2 packet. Therefore, in a preferred embodiment of the present invention, the activation AAL2 packet provides this information for the intermediate node. In an exemplary embodiment of the present invention, the activation AAL2 packet might provide this information by encoding the information in the OAM header 520. For example, the OAM header binary code might indicate that the AAL2 packet is an activation AAL2 packet and that the source intends to utilize one or more particular segment performance characterization factors during the segment performance monitoring session. In an alternative embodiment, the information could be encoded in the message field 535. In yet another exemplary embodiment, the information could be included in the check data field 545; however, this might require that the check data field 545 be expanded. In any event, one skilled in the art will recognize that this information could be encoded in the activation AAL2 packet in any number of different ways.

In addition to knowing which segment performance characterization factor or factors the source intends to utilize during the segment performance monitoring session, the intermediate node might also need to know how long the session is expected to last before it can decide whether resources can be allocated. Therefore, the check data field 545 also contains a test time data field 550. The test time data field 550 is set by the source node, and it reflects an approximation as to how long the segment performance monitoring session is expected to last. For example, each of the 256 possible test time data field binary code combinations can represent a different period of time, wherein each one bit increment represents a 1 second time differential. The value stored in the test time data field 550 is then utilized by each intermediate node to determine whether resources can, in fact, be allocated. Additionally, each intermediate node may utilize the value stored in the test time data field 550 to initialize an internal counter. During the segment performance monitoring session, the intermediate nodes decrement their internal counters. If time expires according to an internal counter, the corresponding intermediate node may decide to release its resources, assuming this has not already been accomplished by a check AAL2 packet. Alternatively, the intermediate node may adjust its internal counter to allow additional time to complete the performance monitoring session.

Figure 6:
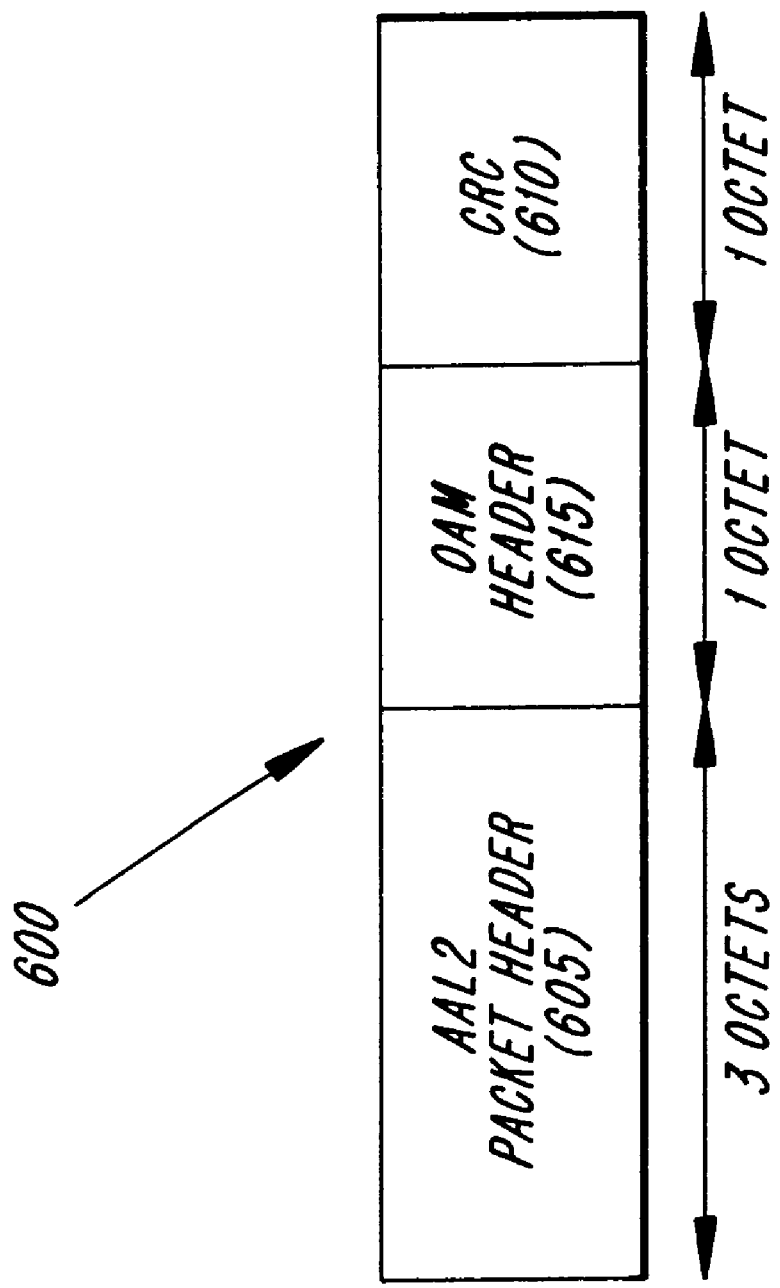
FIG. 6 shows yet another exemplary format for an OAM AAL2 packet.

FIG. 6 shows an exemplary format for an OAM AAL2 packet 600 used for the stop and start AAL2 packets. In accordance with a preferred embodiment of the present invention, the OAM AAL2 packet 600 includes an AAL2 packet header portion 605, which is identical in format to the AAL2 packet header 405 described above; a 1 octet cyclic redundancy code (CRC) 610, which is used for protecting the integrity of the other data field in the OAM AAL2 packet 600, as is well-known in the art; and an OAM header 615. At least one of the OAM header binary code combinations specifically identifies the AAL2 packet 600 as a stop AAL2 packet, while at least one other OAM header binary code combination identifies the AAL2 packet 600 as a start AAL2 packet.

Figure 7:
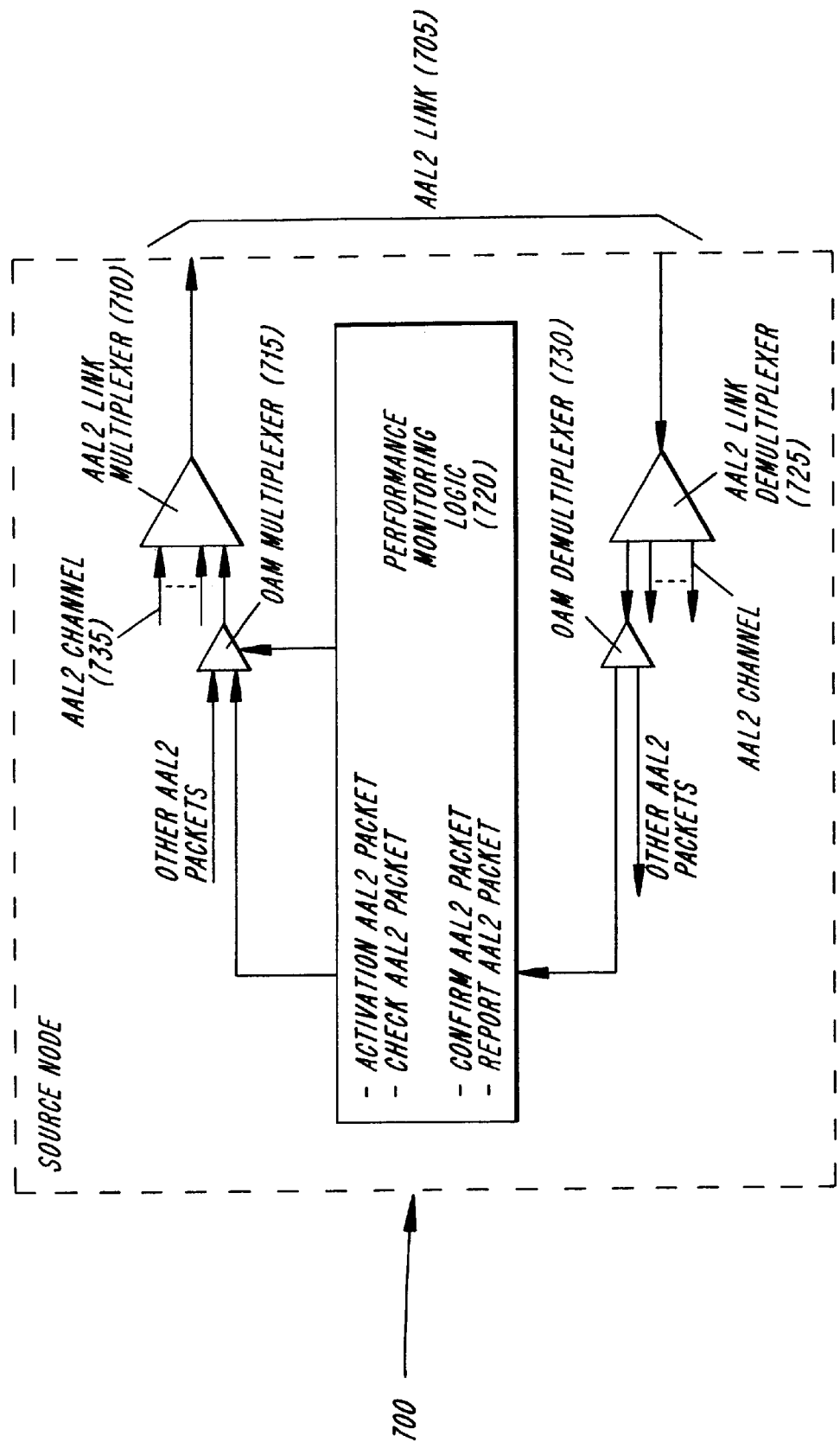
FIG. 7 shows an exemplary hardware embodiment for a source node.

FIG. 7 shows an exemplary hardware embodiment for a source node 700, wherein source node 700 is connected to an adjacent node (not shown) by an AAL2 link 705. The source node 700 includes an AAL2 link multiplexer 710, an OAM multiplexer 715, segment performance monitoring logic 720, an AAL2 link demultiplexer 725, and an OAM demultiplexer 730.

As stated above, each AAL2 channel, for example AAL2 channel 735, makes up but a portion of the AAL2 link 705. The AAL2 link 705 actually consists of a number of AAL2 channels multiplexed together, each with a unique connection identifier (CID). In a preferred embodiment of the present invention, the various AAL2 channels are multiplexed by the AAL2 link multiplexer 710. By multiplexing the various AAL2 channels, AAL2 data packets, both OAM and non-OAM packets are forwarded to the adjacent node via the AAL2 link 705, wherein the adjacent node may be the destination node for some of the AAL2 channels and an intermediate node for the other AAL2 channels. In contrast, the various AAL2 channels received by the source node 700 from the AAL2 link 705 are separated by the AAL2 link demultiplexer 725.

The OAM multiplexer 715 multiplexes OAM AAL2 with other AAL2 packets 545 associated with the same AAL2 channel. The other AAL2 packets may or may not be OAM AAL2 packets. In addition, OAM multiplexer 715 generates and inserts the start and stop AAL2 packets under the control of segment performance monitoring logic 720.

The segment performance monitoring logic 720 is responsible for receiving and generating segment performance monitoring AAL2 packets for the source node 700. As one skilled in the art will understand, the segment performance monitoring logic 720 may be implemented in hardware or it may be implemented in software in accordance with standard programming techniques. More specifically, the segment performance monitoring logic 720 supports the activation phase by generating the activation AAL2 packets, and by analyzing the confirm AAL2 packets received from the OAM demultiplexer 730. The segment performance monitoring logic 720 supports the monitoring phase by generating the check AAL2 packets, based on a block of user-assigned AAL2 data packets. During the reporting phase, the segment performance logic 720 analyzes any messages stored in the report AAL2 packets received from the OAM demultiplexer 730.

Figure 8:
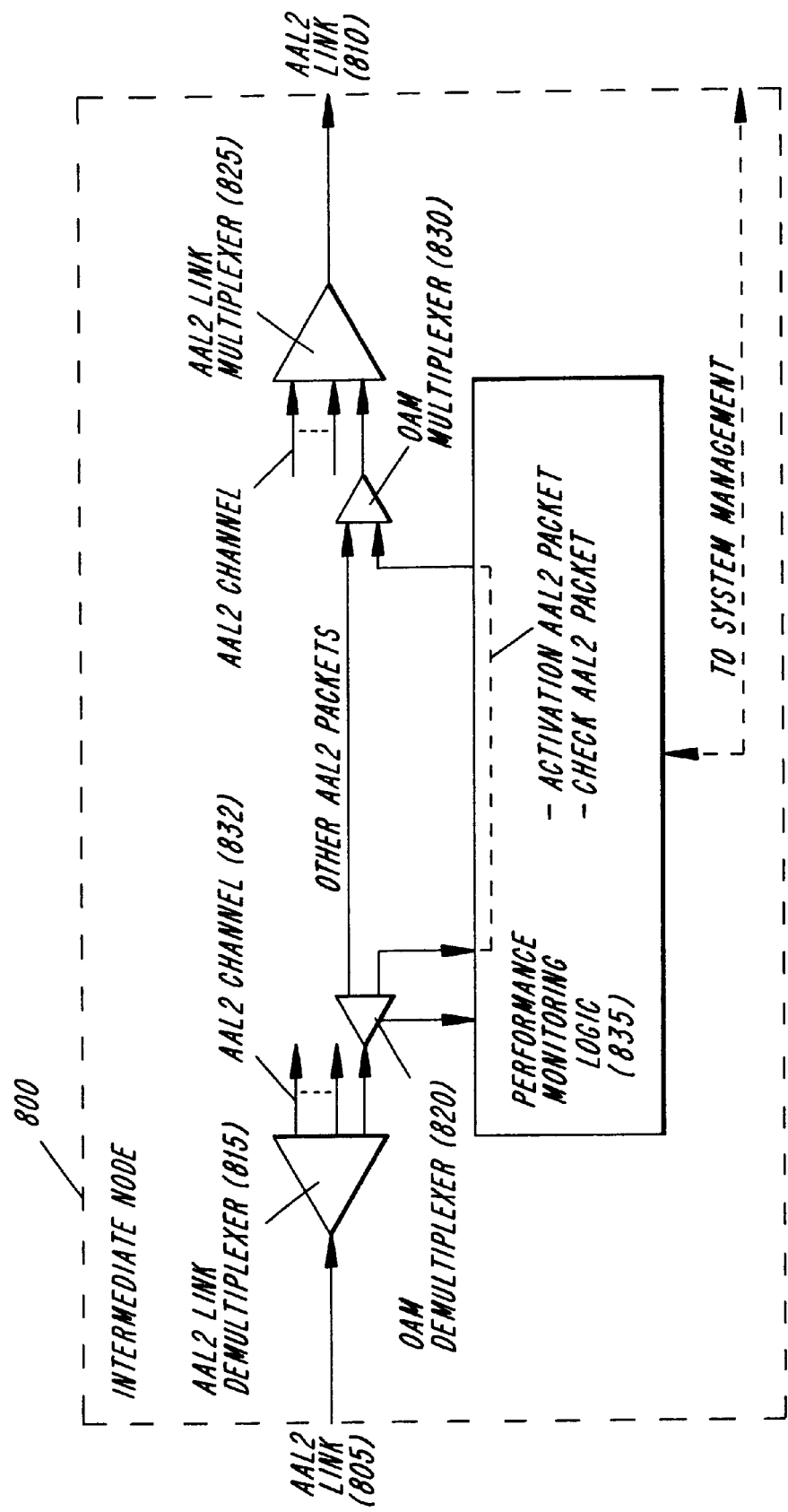
FIG. 8 shows an exemplary hardware embodiment for an intermediate node.

FIG. 8 illustrates an exemplary hardware embodiment for an intermediate node 800, wherein the intermediate node 800 is connected to a source node or an adjacent intermediate node in the direction of the source node by an AAL2 link 805. The intermediate node 800 is also connected to a destination node or an adjacent intermediate node in the direction of the destination node by an AAL2 link 810. It will be understood that the intermediate node 800 can transmit and receive AAL2 packets through both the AAL2 link 805 and the AAL2 link 810, although FIG. 8 only shows the intermediate node 800 receiving AAL2 packets from AAL2 link 805 and transmitting AAL2 packets to AAL2 link 810.

As shown in FIG. 8, the intermediate node 800 includes an AAL2 link demultiplexer 815, an OAM demultiplexer 820, an AAL2 link multiplexer 825, and an OAM multiplexer 830. In addition, the intermediate node 600 includes segment performance monitoring logic 835. Although it is not shown in FIG. 8, it will be understood that the intermediate node 800 includes a second AAL2 link demultiplexer, a second OAM demultiplexer, a second AAL2 link multiplexer, and a second OAM multiplexer so that AAL2 packets can be transmitted and received in both directions over the AAL2 link 805 and the AAL2 link 810.

In general, it is the responsibility of the intermediate node 800 to relay AAL2 packets, associated with the different AAL2 channels, to a next node. The AAL2 link multiplexer 825 as well as the AAL2 link demultiplexer 815 operate the same way as the AAL2 link multiplexer 710 and the AAL2 link demultiplexer 725 in the source node 700 described above. The AAL2 link multiplexer 825 and AAL2 link demultiplexer 815 handle the relaying of AAL2 packets from the intermediate node 800 to the next node. As one skilled in the art will recognize, an AAL2 channel, for example AAL2 channel 832, entering the intermediate node 800 from the AAL2 link 805 may be passed to the AAL2 link multiplexer 825 and transmitted over the AAL2 link 810, or the AAL2 channel 832 may be routed in another direction, through an AAL2 link multiplexer (not shown) other than the link multiplexer 825, and over an AAL2 link (not shown) other than the AAL2 link 810.

During the activation phase, the OAM demultiplexer 820 detects activation AAL2 packets by recognizing the binary code combination in the OAM header that corresponds with activation AAL2 packets. The OAM demultiplexer 820 then sends the activation AAL2 packet to the segment performance monitoring logic 835, wherein the regard and/or disregard counters, described above, are appropriately incremented, depending upon whether the intermediate node 800 is able to allocate resources. If the node intends to allocate its resources, the segment performance monitoring logic 835 initializes an internal counter (not shown) using the value stored in the test time data field of the activation AAL2 packet, as described above. The segment performance monitoring logic 835 then begins decrementing the counter as the activation AAL2 packet is forwarded through the OAM multiplexer 830 and the AAL2 link multiplexer 825 to the next node along the AAL2 connection.

During the monitoring phase, the OAM demultiplexer 820 identifies the start AAL2 packet by recognizing the binary code combination in the OAM header that corresponds with the start AAL2 packets. The segment performance monitoring logic 835 then begins accumulating the value for the segment performance characterization factor or factors (e.g., packet count and bit interleaved parity code) based on all of the AAL2 data packets in the block of user-assigned AAL2 data packets following the start AAL2 packet. The OAM demultiplexer 820 also identifies the stop AAL2 packet by recognizing the binary code combination in the OAM header corresponding to stop AAL2 packets. In a preferred embodiment, the stop AAL2 packet indicates the end of the user-assigned AAL2 data packet block. Assuming the internal counter has not elapsed, the segment performance monitoring logic 835 must now wait for the arrival of the check AAL2 packet. Again, the OAM demultiplexer 820 identifies the check AAL2 packet by recognizing the binary code combination in the OAM header that corresponds with check AAL2 packets.

The segment performance monitoring logic 835 then determines whether the data has been corrupted. As explained above, the segment performance monitoring logic 835 accomplishes this by first comparing the generated value stored in the check AAL2 packet with the measured value also stored in the check AAL2 packet for each segment performance characterization factor. If the generated and measured values match each other, the segment performance monitoring logic 835 compares the generated value with the value accumulated by the segment performance monitoring logic 835 for each segment performance characterization factor. If the generated value does not match the accumulated value, the segment performance monitoring logic 835 replaces the measured value with the accumulated value. The segment performance monitoring logic 835 generates the appropriate message code and stores it in the message field of the check AAL2 packet. The check AAL2 packet is then transmitted to each of the remaining intermediate nodes in the AAL2 connection, wherein the resources at these intermediate nodes are released.

Figure 9:
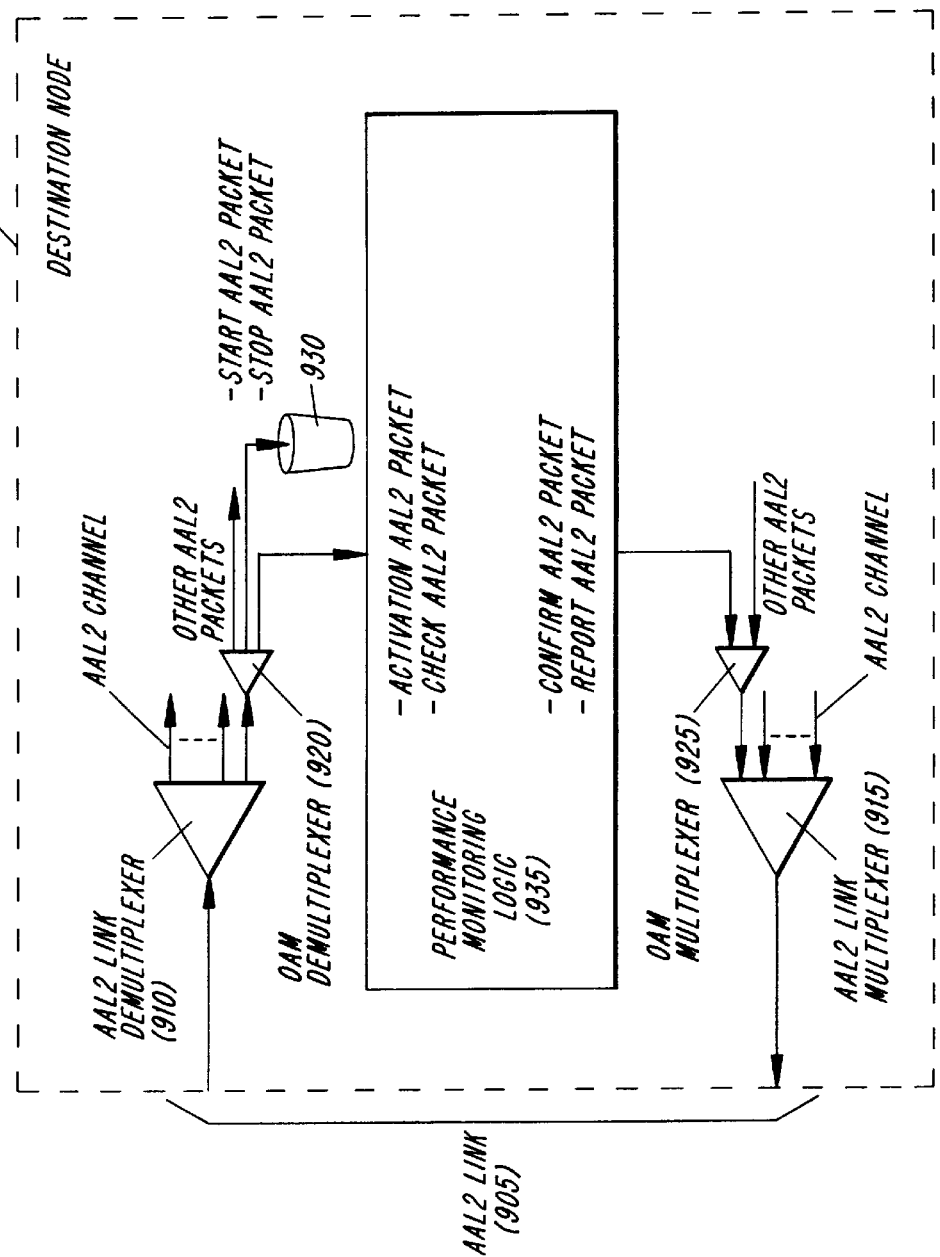
FIG. 9 shows an exemplary hardware embodiment for a destination node.

FIG. 9 represents an exemplary hardware embodiment for a destination node 900, in accordance with the present invention, wherein the destination node 900 is connected to an adjacent node in the direction of the source node by AAL2 link 905. The destination node 900 includes an AAL2 link demultiplexer 910, an AAL2 link multiplexer 915, an OAM demultiplexer 920, and an OAM multiplexer 925. The AAL2 link and OAM multiplexers 915 and 925, as well as the AAL2 link and OAM demultiplexers 910 and 920, operate in a similar manner as the multiplexers and demultiplexers described above with respect to the source node 700 and the intermediate node 800. One difference, however, is that the OAM demultiplexer 920 has the ability to throw away the start AAL2 packets and the stop AAL2 packets, as symbolized by the "waste bucket" 930, since these packets are no longer needed once they reach the destination node 900.

The destination node 900 also includes segment performance monitoring logic 935. During the activation phase, the segment performance monitoring logic 935 converts the activation AAL2 packet into a confirm AAL2 packet by changing the UUI field in the AAL2 packet header to reflect an end-to-end packet, and by changing the OAM header from the binary code combination specifying an activation AAL2 packet to the binary code combination specifying a confirm AAL2 packet. During the monitoring phase, the segment performance logic 935 accumulates a value for each segment performance characterization factor in the same way that the segment performance monitoring logic 720, in the source node 700, and the segment performance monitoring logic 835, in the intermediate node 800, accumulated values for each segment performance characterization factor. Upon receiving the check AAL2 packet, the segment performance monitoring logic 935 similarly analyzes the generated and measured values in the check AAL2 packet, and, if necessary, the segment performance monitoring logic 935 also compares the generated value to the accumulated value. During the report phase, the segment performance monitoring logic 935 converts the check AAL2 packet into a report AAL2 packet by changing the UUI field in the AAL2 packet header to reflect an end-to-end packet, and by changing the OAM header from the binary code combination specifying a check AAL2 packet to the binary code combination specifying a report AAL2 packet. The segment performance monitoring logic 935 then causes the report AAL2 packet to be transmitted back to the source node, through the OAM multiplexer 925, the AAL2 link multiplexer 915, and over the AAL2 link 905.

The techniques and hardware implementations associated with segment performance monitoring described above, provide a simple, efficient, and precise way of identifying and locating points of degradation in a telecommunications connection, such as an AAL2 connection. Consequently, the present invention conserves valuable network time and network resources as compared with prior techniques.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method for detecting segment performance in a telecommunications connection comprising the steps of:

transmitting a block of data from a first node in the telecommunications connection to a second node in the telecommunications connection;

transmitting a first communication packet from the first node to the second node, wherein the first communication packet contains a value for a segment performance characterization factor based on the block of data;

in the second node, formulating a value for the segment performance characterization factor as a function of the block of data, and forwarding the block of data to a third node in the telecommunications connection;

comparing the value of the segment performance characterization factor in the first communication packet with the value of the segment performance characterization factor formulated by the second node;

forwarding the first communication packet from the second node to the third node for further processing if the value of the segment performance characterization factor in the first communications packet compares with the value of the segment performance characterization factor formulated by the second node;

forwarding the first communication packet from the second node to a destination node and any intermediate nodes located along the telecommunications connection between the second node and the destination node without further processing if the value of the segment performance characterization factor in the first communication packet does not compare with the value of the segment performance characterization factor formulated by the second node; and generating a second communications packet indicating that segment performance degradation has been detected if the value of the segment performance characterization factor in the first communication packet does not compare with the value of the segment performance characterization factor formulated by the second node.

2. The method of claim 1 further comprising the steps of:

transmitting a third communication packet marking the beginning of the block of data; and transmitting a fourth communications packet marking the end of the block of data.

3. The method of claim 1, wherein the value of the segment performance characterization factor in the first communications packet is generated by a source node.

4. The method of claim 3, wherein the first node is the source node.

5. The method of claim 3, wherein said step of formulating a value for the segment performance characterization factor comprises the step of:

accumulating the value for the segment performance characterization factor using a same technique as used by the source node to generate the value for the segment performance characterization factor in the first communications packet.

6. The method of claim 1 further comprising the step of:

forwarding the second communication packet to a source node.

7. The method of claim 6 further comprising the step of:

transmitting the second communication packet from the second node.

8. The method of claim 6 further comprising the step of:

transmitting the second communication packet from the destination node.

9. The method of claim 1, wherein said telecommunications connection is an asynchronous transfer mode adaptation layer two connection.

10. A method for monitoring the performance of one or more segments along a telecommunications connection comprising the steps of:

determining whether to monitor the performance of the one or more segments based on a number of participating nodes along the telecommunications connection;

if it is determined that the performance of the one or more segments is to be monitored, transmitting a block of data packets from a source node to a destination node and each intermediate node along the telecommunications connection located between the source node and the destination node;

generating a first value for a segment performance characterization factor based on the block of data packets;

inserting the first value into a first location of a first communication packet and a copy of the first value into a second location of the first communication packet;

transmitting the first communication packet from the source node to the destination node and each intermediate node;

at a participating intermediate node, comparing the first value and the copy of the first value, and forwarding the first communication packet from the participating intermediate node to the destination node and each intermediate node between the participating intermediate node and the destination node if the comparison indicates that the first value and the copy of the first value do not match;

in the participating intermediate node, formulating a second value for the segment performance characterization factor and comparing the second value to the first value in the first location of the first communication packet if the comparison between the first value and the copy of the first value indicates that the first value and the copy of the first value do match;

if the comparison between the second value and the first value do not match, copying the second value into the second location of the first communication packet and forwarding the first communication packet from the participating intermediate node to the destination node and each intermediate node between the participating intermediate node and the destination node without further processing;

generating a second communication packet indicating segment performance degradation has been detected if the first value does not match the second value; and forwarding the first communication packet to a next participating intermediate node for processing if the first value and the second value match.

11. The method of claim 10 further comprising the step of:

determining which intermediate nodes can allocate resources for monitoring the performance of the one or more segments.

12. The method of claim 11 further comprising the steps of:

transmitting a third communication packet from the source node to each intermediate node, in turn, wherein the third communication packet contains a data field for tracking the number of participating intermediate nodes;

at each intermediate node, incrementing the data field, if the intermediate node can allocate resources for monitoring the performance of the one or more segments; and transmitting the number of participating intermediate nodes to the source node.

13. The method of claim 12 further comprising the steps of:

transmitting the third communication packet to the destination node; and generating a fourth communication packet containing the number of participating intermediate nodes from the destination node to the source node.

14. The method of claim 11 further comprising the step of:

generating a third communication packet containing a value representing an amount of time required to monitor the one or more segments; and determining which intermediate nodes can allocate resources for monitoring the performance of the one or more segments based on the amount of time required to monitor the one or more segments.

15. The method of claim 11 further comprising the step of:

generating a third communication packet identifying the segment performance characterization factor; and determining which intermediate nodes can allocate resources for monitoring the performance of the one or more segments based on the segment performance characterization factor.

16. The method of claim 10 further comprising the steps of:

transmitting a third communication packet marking the beginning of the block of data packets; and transmitting a fourth communication packet marking the end of the block of data packets.

17. The method of claim 10, wherein said step of processing the first communication packet by formulating a second value for the segment performance characterization factor comprises the step of:

accumulating the second value for the segment performance characterization factor using a same technique as used by the source node to generate the first value for the segment performance characterization factor.

18. The method of claim 10 further comprising the step of:

forwarding the second communication packet to the source node.

19. The method of claim 18 further comprising the step of:

transmitting the second communication packet from the participating intermediate node.

20. The method of claim 18 further comprising the step of:

transmitting the second communication packet from the destination node.

21. The method of claim 10, wherein said telecommunications connection is an asynchronous transfer mode adaptation layer two connection.

22. The method of claim 10, wherein the segment performance characterization factor is a data packet count.

23. The method of claim 10, wherein the segment performance characterization factor is a block error detection code.

24. The method of claim 23, wherein the block error detection code is abit interleaved parity code.

25. An apparatus for detecting segment performance in a telecommunications connection comprising:

first means for transmitting a block of data from a first node in the telecommunications connection to a second node in the telecommunications connection;

second means for transmitting a first communication packet from the first node to the second node, wherein the first communication packet contains a value for a segment performance characterization factor based on the block of data;

in the second node, first logic means for formulating a value for the segment performance characterization factor as a function of the block of data, and forwarding the block of data to a third node in the telecommunications connection;

second logic means for comparing the value of the segment performance characterization factor in the first communication packet with the value of the segment performance characterization factor formulated by the second node;

first means for forwarding the first communication packet from the second node to the third node for further processing if the value of the segment performance characterization factor in the first communications packet compares with the value of the segment performance characterization factor formulated by the second node;

second means for forwarding the first communication packet from the second node to a destination node and any intermediate nodes located along the telecommunications connection between the second node and the destination node without further processing if the value of the segment performance characterization factor in the first communication packet does not compare with the value of the segment performance characterization factor formulated by the second node; and means for generating a second communications packet indicating that segment performance degradation has been detected if the value of the segment performance characterization factor in the first communication packet does not compare with the value of the segment performance characterization factor formulated by the second node.

26. The apparatus of claim 25 further comprising:

third means for transmitting a third communication packet marking the beginning of the block of data; and fourth means for transmitting a fourth communications packet marking the end of the block of data.

27. The apparatus of claim 25, wherein the value of the segment performance characterization factor in the first communications packet is generated by a source node.

28. The apparatus of claim 27, wherein the first node is the source node.

29. The apparatus of claim 27, wherein said first means for formulating a value for the segment performance characterization factor comprises the step of:

third logic means for accumulating the value for the segment performance characterization factor using a same technique as used by the source node to generate the value for the segment performance characterization factor in the first communications packet.

30. The apparatus of claim 25 further comprising:

third means for forwarding the second communication packet to a source node.

31. The apparatus of claim 30 further comprising:

third means for transmitting the second communication packet from the second node.

32. The apparatus of claim 30 further comprising:

third means for transmitting the second communication packet from the destination node.

33. The apparatus of claim 25, wherein said telecommunications connection is an asynchronous transfer mode adaptation layer two connection.

34. An apparatus for monitoring the performance of one or more segments along a telecommunications connection comprising:

means for determining whether to monitor the performance of the one or more segments based on a number of participating nodes along the telecommunications connection;

if it is determined that the performance of the one or more segments is to be monitored, first means for transmitting a block of data packets from a source node to a destination node and each intermediate node along the telecommunications connection located between the source node and the destination node;

first means for generating a first value for a segment performance characterization factor based on the block of data packets;

means for inserting the first value into a first location of a first communication packet and a copy of the first value into a second location of the first communication packet;

at a participating intermediate node, means for comparing the first value and the copy of the first value, and means for forwarding the first communication packet from the participating intermediate node to the destination node and each intermediate node between the participating intermediate node and the destination node if the comparison indicates that the first value and the copy of the first value do not match;

second means for transmitting the first communication packet from the source node to the destination node and each intermediate node;

in the participating intermediate node, first logic means for formulating a second value for the segment performance characterization factor and means for comparing the second value to the first value in the first location of the first communication packet if the comparison between the first value and the copy of the first value indicates that the first value and the copy of the first value do match;

if the comparison between the second value and the first value do not match, means for copying the second value into the second location of the first communication packet and first means for forwarding the first communication packet from the participating intermediate node to the destination node and each intermediate node between the participating intermediate node and the destination node without further processing if the first value and the second value do not match;

second means for generating a second communication packet indicating segment performance degradation has been detected if the first value does not match the second value; and second means for forwarding the first communication packet to a next participating intermediate node for processing if the first value and the second value match.

35. The apparatus of claim 34 further comprising:

means for determining which intermediate nodes can allocate resources for monitoring the performance of the one or more segments.

36. The apparatus of claim 35 further comprising:

third means for transmitting a third communication packet from the source node to each intermediate node, in turn, wherein the third communication packet contains a data field for tracking the number of participating intermediate nodes;

at each intermediate node, means for incrementing the data field, if the intermediate node can allocate resources for monitoring the performance of the one or more segments; and fourth means for transmitting the number of participating intermediate nodes to the source node.

37. The apparatus of claim 36 further comprising:

fifth means for transmitting the third communication packet to the destination node; and third means for generating a fourth communication packet containing the number of participating intermediate nodes from the destination node to the source node.

38. The apparatus of claim 35 further comprising:

third means for generating a third communication packet containing a value representing an amount of time required to monitor the one or more segments; and means for determining which intermediate nodes can allocate resources for monitoring the performance of the one or more segments based on the amount of time required to monitor the one or more segments.

39. The apparatus of claim 35 further comprising the step of:

fourth means for generating a third communication packet identifying the segment performance characterization factor; and means for determining which intermediate nodes can allocate resources for monitoring the performance of the one or more segments based on the segment performance characterization factor.

40. The apparatus of claim 34 further comprising:

third means for transmitting a third communication packet marking the beginning of the block of data packets; and fourth means for transmitting a fourth communication packet marking the end of the block of data packets.

41. The apparatus of claim 34, wherein said first logic means for processing the first communication packet by formulating a second value for the segment performance characterization factor comprises:

second logic means for accumulating the second value for the segment performance characterization factor using a same technique as used by the source node to generate the first value for the segment performance characterization factor.

42. The apparatus of claim 34 further comprising:

third means for forwarding the second communication packet to the source node.

43. The apparatus of claim 42 further comprising:

third means for transmitting the second communication packet from the participating intermediate node.

44. The apparatus of claim 42 further comprising:

third means for transmitting the second communication packet from the destination node.

45. The apparatus of claim 34, wherein said telecommunications connection is an asynchronous transfer mode adaptation layer two connection.

46. The apparatus of claim 34, wherein the segment performance characterization factor is a data packet count.

47. The apparatus of claim 34, wherein the segment performance characterization factor is a block error detection code.

48. The apparatus of claim 47, wherein the block error detection code is abit interleaved parity code.

* * * * *